United States Patent [19]

Schlosser

[11] Patent Number: 4,829,978

[45] Date of Patent: May 16, 1989

[54] GAS GRILL WITH INSECT DETERRENT

[75] Inventor: Erich J. Schlosser, Barrington, Ill.

[73] Assignee: Weber-Stephen Products Co., Palatine, Ill.

[21] Appl. No.: 136,902

[22] Filed: Dec. 22, 1987

[51] Int. Cl.⁴ .............................................. F24C 3/00
[52] U.S. Cl. .............................. 126/41 R; 126/39 K; 43/107; 431/354
[58] Field of Search ...................... 126/41 R, 38, 39 E, 126/39 R, 25 R, 39 K, 39 J; 431/354, 355, 356; 43/109, 107, 121; 55/493, 505, 522; 285/112, 373, 419, 177

[56] References Cited

U.S. PATENT DOCUMENTS

| | | | |
|---|---|---|---|
| 1,137,266 | 4/1915 | James | 55/493 |
| 3,051,230 | 8/1962 | Hart | 55/505 |
| 3,269,299 | 8/1966 | Nielsen | 99/391 |
| 3,456,965 | 7/1969 | Gajewski et al. | 285/419 |
| 3,688,758 | 9/1972 | Stephen, Jr. | 126/41 R |
| 4,671,541 | 6/1987 | Webb et al. | 285/112 |
| 4,747,391 | 5/1988 | Hanagan et al. | 126/41 R |

Primary Examiner—James C. Yeung
Attorney, Agent, or Firm—Wallenstein, Wagner, Hattis & Strampel

[57] ABSTRACT

A gas burner includes a burner tube that has a gas supply tube extending into one end and an air intake orifice adjacent thereto. A perforated shield is clamped onto the tubes to enclose the air intake orifice.

2 Claims, 1 Drawing Sheet

U.S. Patent
May 16, 1989
4,829,978
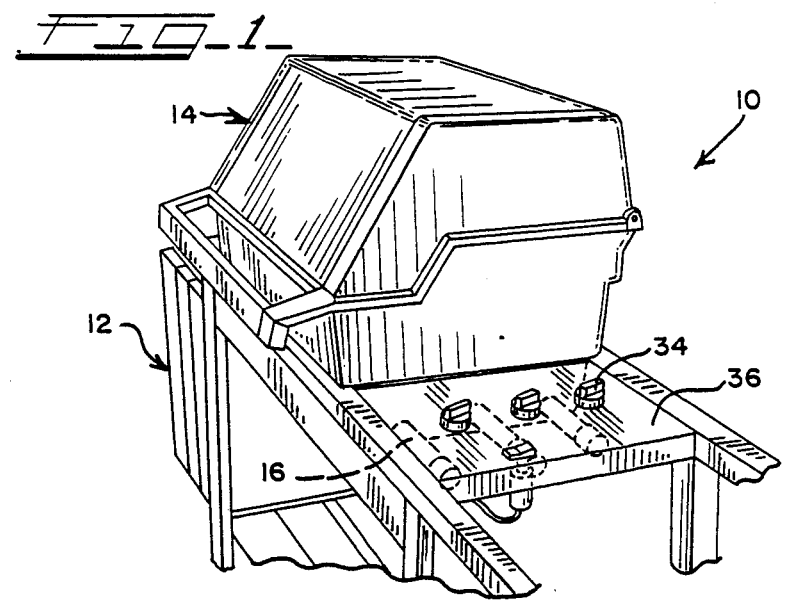
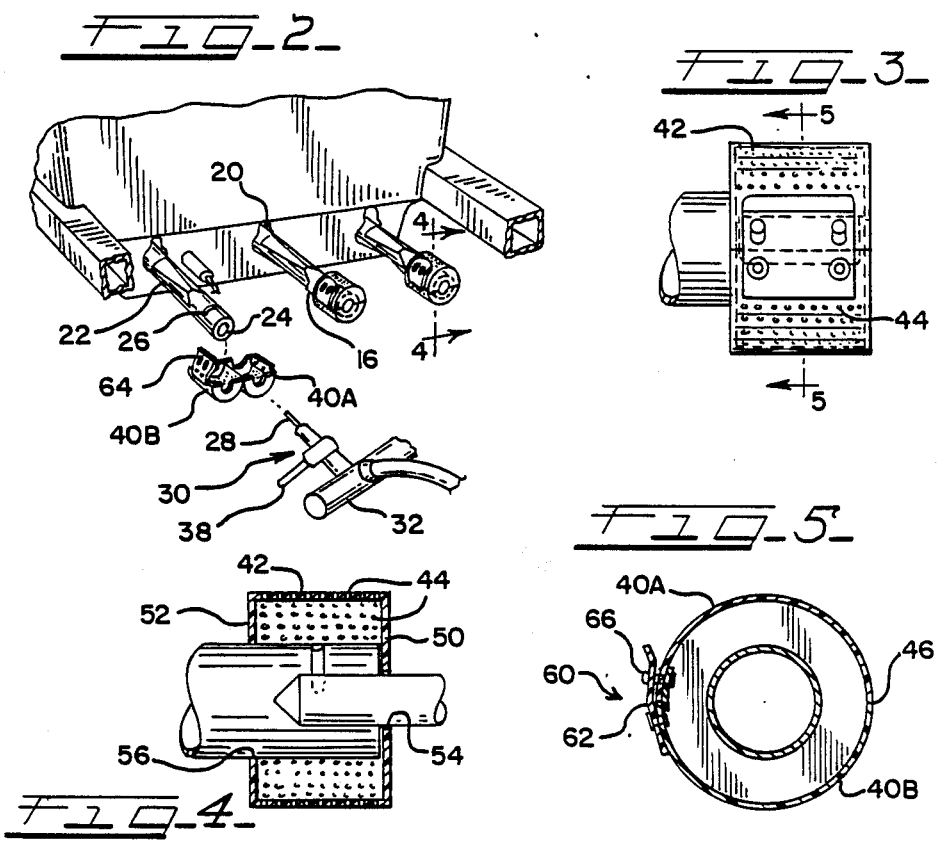

4,829,978

GAS GRILL WITH INSECT DETERRENT

DESCRIPTION

1. Technical Field

The present invention relates generally to gas barbeque grills and more particularly to an anti-clog device for the air intake of the gas burner.

2. Background Art

Gas barbeque grills have been in existence for a number of years. These grills usually include one or more burner tubes that have gas supplied thereto through a valve having its outlet extending into one end of the tube. The burner tube also has an air intake located adjacent the end of the tube and a venturi spaced from the gas and air inlet to draw a predetermined amount of air through the inlet to mix with the supply of gas and provide a proper mixture for combustion.

One of the problems that has been encountered is that nocturnal insects, such as spiders, tend to be attracted to the air inlet to the tube. These insects, and in particular spiders, will crawl into the tube through the inlet and nest in the venturi restriction while building webs which will severely restrict the flow of the gas and air mixture to the remainder of the tube. As the tube becomes clogged or obstructed, gas is forced out of the air inlet where it can ignite and create a severe fire hazard. Furthermore, any ignition of gas outside of the burner tube can melt the control knobs since they are located in close proximity to the burner tube inlet.

In order to minimize this problem, specific instructions are provided in gas grills for periodically dissembling the components and cleaning out the burner tube, particularly in the restricted venturi area. This is time consuming and often not done by the typical homeowner.

Thus, there remains a need for simplified solution to the problem discussed above.

SUMMARY OF THE INVENTION

According to the present invention, a simplified solution to the clogging problem has been developed and existing burner tubes can readily be retrofitted with the device.

More specifically, a perforated sleeve has been developed that can be snap fitted over the area surrounding air inlet to prevent foreign objects from entering the burner tube through the air inlet and yet provide ample air to admix with the gas in the burner tube. The sleeve or shield means consists of a perforated member, preferably formed of plastic and consisting of two halves that are interconnected along one edge by an integral hinge and at an opposed edge by suitable connecting means, such as a latch, detent or the like. The perforated member is preferably circular and has inwardly directed flanges at opposite ends that respectively engage the burner tube and the gas inlet tube to substantially seal the area surrounding the air inlet orifice.

BRIEF DESCRIPTION OF DRAWINGS

FIG. 1 discloses a gas grill to which the particular invention is particularly adapted;

FIG. 2 is a fragmentary exploded view, showing the arrangement of parts;

FIG. 3 is a side view of the present invention;

FIG. 4 is a cross sectional view, as viewed along line 4—4 of FIG. 2; and

FIG. 5 is a cross sectional view as viewed along line 5—5 of FIG. 3.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings discloses a gas barbeque grill generally designated by reference numeral 10. The grill that has been depicted is of the type that is disclosed in U.S. Pat. No. 4,677,964, incorporated herein by reference.

Gas grill 10 includes a cart 12 that supports a fire box 14 that has gas burner tubes 16 extending through openings 20. Each burner tube 16 is circular in cross section and has a restricted venturi 22 defined adjacent an inlet opening 24.

An air intake orifice or means 26 is located on the periphery of burner tube 16 and is located between inlet opening 24 and venturi 22. A valve outlet tube 28 is part of a control valve 30 and extends into the opening 24 to supply gas from a manifold 32. A control knob 34 located on a console 36 connects to the valve stem 38 to control the flow of gas to the burner tube.

According to the present invention, a shield means is provided to surround and enclose the air inlet means. The shield means is identified by reference numeral 40 and consists of a generally circular member 42 that has a plurality of small perforations 44. The perforations are sized to prevent entry of insects while being large enough to admit air to the burner. The total area of the perforations will exceed the area of the burner vent 26 to assure an adequate supply of air. Preferably, the total area of the openings is at least twice the area of the air intake openings so that there is an adequate supply of air even if some perforations become clogged.

The shield 40 may be formed of any suitable material, such as plastic, and consists of two halves 40A and 40B that are interconnected along one edge by an integral hinge 46. The integral hinge is preferably produced by forming a weakened area in the plastic body member 42.

The shield 40 also has first and second inwardly directed flanges 50 and 52 extending inwardly from opposite edges of member 42. The respective flanges 50 and 52 have openings 54 and 56 defined therein that are respectively sized to snugly engage the burner tube 16 and the valve tube 28. The flanges could also be perforated to provide more open area. If desired, the wall thickness of the flanges 50 and 52 may be reduced at their inner margins to allow them to flex to conform with any irregularities in surface they engage.

The integral hinge 46 forms part of a connection means that interconnects the member halves 40A and 40B. The connecting means 60 may consist of a latch member 62 connected to one shield halve 40B with openings 64 for receiving pins 66 on the other shield halve 40A.

In use of the novel mechanism, the burners are assembled in their normal manner and the shields are snap fitted over the burner tubes and the valve tubes to enclose the orifice 26. In the assembled condition, the shield 40 has its flanges 50 and 52 in clamping engagement with the adjacent tubes to prevent an insect from gaining access to the interior of the shield.

It will be appreciated that the novel anti-clog means is inexpensive to manufacture and can readily be retrofitted on burners of existing grills by the owners to eliminate the need for periodic cleaning.

Of course numerous modifications come to mind without departing from the spirit of the invention. For example, the shape of the unit could easily be changed to an oval or rectangular configuration. Also, the shield could be formed as one piece and telescoped onto the burner tube before the valve tube is inserted into the end of the burner tube.

While the air intake has been shown to be on the periphery of the burner tube, it could be on the end of this tube.

While the specific embodiments have been illustrated and described, numerous modifications come to mind without significantly departing from the spirit of the invention and the scope of protection is only limited by the scope of the accompanying claims.

I claim:

1. A gas burner including a burner tube open at one end and having a gas supply tube extending into said one end with said burner tube having air intake openings adjacent to said one end, a shield including a perforated sleeve having openings sized to prevent entry of nocturnal insects and clamped onto said tubes, said sleeve including sleeve halves interconnected along one edge by hinge means, said perforated sleeve having inwardly-directed flanges at opposite ends respectively clampingly engaging said tubes to position said sleeve around and spaced from said air intake openings and latch means on an opposite edge of said sleeve halves.

2. A gas burner as defined in claim 1, in which said sleeve is formed with a plastic material and said hinge means includes an integral hinge between said sleeve halves.

* * * * *

UNITED STATES PATENT AND TRADEMARK OFFICE
Certificate

Patent No. 4,829,978                                                  Patented: May 16, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
  Erich J. Schlosser and Christopher V. Childers.

Signed and Sealed this Fourth Day of December 1990.

IRA S. LAZARUS

*Supervisory Patent Examiner*
*Art Unit 346*